United States Patent [19]

Antonas et al.

[11] 4,332,598
[45] Jun. 1, 1982

[54] PROCESS FOR TREATING INDUSTRIAL GAS STREAM

[75] Inventors: Ioannis A. Antonas, Gillingham; Rodney J. Allam, Guildford, both of England; William P. Hegarty, Wescosville, Pa.

[73] Assignee: Air Products and Chemicals, Inc., Allentown, Pa.

[21] Appl. No.: 206,731

[22] Filed: Nov. 13, 1980

[51] Int. Cl.³ .............................................. F25J 3/02
[52] U.S. Cl. ........................................ 62/17; 62/28; 62/29; 55/68; 55/73
[58] Field of Search ............... 55/68, 73; 62/17, 29, 62/28

[56] References Cited

U.S. PATENT DOCUMENTS

| | | | |
|---|---|---|---|
| 3,417,572 | 12/1968 | Pryor | 62/17 |
| 3,498,067 | 3/1970 | Ranke | 62/17 |
| 3,910,777 | 10/1975 | Jakob | 55/68 |
| 3,918,934 | 11/1975 | Kriebel et al. | 55/68 |
| 4,052,176 | 10/1977 | Child et al. | 55/73 |
| 4,152,129 | 5/1979 | Trentham | 62/18 |
| 4,242,108 | 12/1980 | Nicholas et al. | 55/68 |

Primary Examiner—Norman Yudkoff
Attorney, Agent, or Firm—Russell L. Brewer; E. Ugene Innis; James C. Simmons

[57] ABSTRACT

This invention relates to a method for producing a hydrogen stream and a carbon dioxide stream from a mixed gas feedstock containing hydrogen, carbon dioxide, and contaminant sulfur compounds. The method comprises scrubbing the gas feedstock with a carbon dioxide laden solvent in an initial scrubbing zone under conditions such that not more than 70% of the carbonyl sulfide in the feedstock is removed in the initial zone, physically scrubbing the initially scrubbed feedstock with a solvent under conditions sufficient for removing substantially all the carbon dioxide and carbonyl sulfide therefrom to leave a pure hydrogen stream desorbing carbon dioxide and carbonyl sulfide and other gases from the liquid from the second scrubbing zone and then fractionating the resultant carbon dioxide stream containing hydrogen, carbon oxides, etc. to produce said carbon dioxide stream for use in urea synthesis.

8 Claims, 2 Drawing Figures

PROCESS FOR TREATING INDUSTRIAL GAS STREAM

TECHNICAL FIELD

This invention relates to a method adapted for treating a gas comprising hydrogen, carbon dioxide, carbon monoxide, methane, hydrogen sulfide and carbonyl sulfide to provide a stream of hydrogen suitable for use in an ammonia plant and a stream of carbon dioxide suitable for use in a urea plant.

BACKGROUND OF PRIOR ART

Commercially, urea is synthesized by reacting ammonia and carbon dioxide. Ammonia is synthesized by reacting nitrogen and hydrogen over a catalyst. The urea synthesis plant and ammonia synthesis plants are frequently situated immediately adjacent each other since the feed gas for both processes is generally obtained from the same source, viz, a gas obtained by the partial oxidation of oil or coal. Typically, such gas comprises (mole %).

| Hydrogen | 45-70% |
|---|---|
| Carbon Dioxide | 25-45% |
| Hydrogen Sulfide | 0.5-1.5% |
| Carbonyl Sulfide | 0.001-0.2% |
| Carbon Monoxide, Argon, Nitrogen, Methane | Balance (typically 0.5-25% |

For ammonia synthesis, hydrogen free of sulfur compounds and carbon dioxide is recovered and for urea synthesis carbon dioxide free of sulfur compounds is recovered. Sulfur compounds in ammonia synthesis are prohibited because they act as catalyst poisons. Urea synthesis differs from ammonia synthesis in that hydrocarbons, ($CH_4$) CO, and particularly $H_2$, are detrimental when present in the urea carbon dioxide feed gas. These gases tend to "build-up" in the system and, because $O_2$ is typically added to inhibit urea reaction system corrosion, can present a plant explosion hazard. Accordingly the hydrocarbons, CO and hydrogen are removed from the feed $CO_2$ by catalytic oxidation prior to introduction to the urea synthesis unit. Sulfur compounds are poisonous to the oxidation catalysts and therefore have to be removed from the system in addition to the hydrocarbons, CO and hydrogen. Note, however, that sulfur components are reacted away and do not build up and cause explosion problems.

Various processes have been utilized to remove acidgases from gas mixtures so that the poisonous effects on catalysts in both ammonia and urea production can be eliminated. These processes include chemical absorption, physical absorption, and adsorption on solids. Physical absorption processes take advantage of different physical solubilities of gases in liquid and provide significant advantages as compared to other processes in terms of reduced power consumption. A description of physical absorption processes is set forth in the following references:

U.S. Pat. No. 4,050,909 and Ranke, *Linde-Report on Science and Technology*, Volume 18, pages 7-13 (1973) disclose a process for recovering substantially pure carbon dioxide and hydrogen for use in the production of urea and ammonia respectively from gas obtained by the partial oxidation of oil or coal. In this recovery process the raw gas is initially scrubbed in a bottom portion of an absorption column with carbon dioxide laden methanol at high pressure thereby forming a scrubbing agent laden with sulfur compounds and an initially scrubbed gas. The initially scrubbed gas then is introduced to another section of the absorption column and contacted with pure methanol thereby producing a gas discharge stream enriched in hydrogen (containing small proportions of nitrogen, argon, methane (hydrocarbons), carbon monoxide and carbon dioxide and a carbon dioxide laden methanol stream. A portion of the carbon dioxide laden methanol stream is directed to the initial scrubbing stage while the balance is regenerated via pressure reduction and thermal techniques. Optionally, nitrogen is used to aid in removing carbon dioxide from the solvent. Carbon dioxide free of sulfur compounds is obtained as a product and pure methanol is recovered for recycling to the process.

U.S. Pat. No. 3,498,067 discloses a process similar to the '909 process. A methanol scrubbing agent laden with carbon dioxide is used as a solvent for hydrogen sulfide and residual carbonyl sulfide. By using the partially laden scrubbing agent, $H_2S$ scrubbing can be confined to a small section in the column and energy requirements are reduced by virtue of passing less solvent through the lower section. U.S. Pat. No. 4,152,129 discloses a process for cryogenically separating carbon dioxide from methane where carbon dioxide is present in large quantities. The process comprises fractionating the carbon dioxide by selecting conditions such that the carbon dioxide will not freeze out in the equipment. Streams rich in carbon dioxide and in methane are obtained.

In the prior art physical absorption processes substantially all of the sulfur compounds, including carbonyl sulfide, were removed from the feed gas in a single absorption step. Each employed a carbon dioxide laden solvent as a scrubbing agent and solvent rates were adjusted so that substantially all of the sulfur compounds were removed in the initial scrubbing operation. Solvent requirements to achieve removal of all the sulfur compounds, and carbonyl sulfide particularly, in the initial stage required high solvent rates and required substantial energy requirements to remove the sulfur compounds from the solvent. This is particularly true with the commercial physical absorption processes using N-methyl pyrrolidone or mixtures of the alkyl ethers of polyethylene glycol as solvents.

SUMMARY OF THE INVENTION

It has been found that the energy requirements necessary for a physical solvent process for separating a stream of hydrogen substantially free of contaminants for ammonia synthesis and a $CO_2$ stream suitable for urea synthesis from a feed gas stream obtained from the partial oxidation of oil or coal can be reduced significantly by selectively removing hydrogen sulfide from the feed gas while permitting a significant proportion of the carbonyl sulfide and carbon dioxide to pass through to be removed in a second absorption stage. Then the carbon dioxide is absorbed by a scrubbing agent and the carbon dioxide recovered by desorbing from the scrubbing agent. Coabsorbed hydrocarbons and CO residual hydrogen and/or sulfur contaminants can then be removed by cryogenically fractionating the stream to produce a stream of $CO_2$ suitable for urea plant feed.

Significant advantages result by operating the physical absorption process as described. First, energy requirements for producing a carbon dioxide stream suitable for urea synthesis and a hydrogen stream suitable for ammonia synthesis is significantly reduced.

Second, the catalytic oxidation step normally utilized in prior art urea processes for removing residual hydrogen and methane in the gas stream can be eliminated.

Third, there is an ability to recover carbon dioxide from the desorber at higher pressures than alternative prior art processes. This is due to the lower solvent requirements in the $H_2S$ absorber which decreases $CO_2$ coabsorbtion there. This leaves a higher $CO_2$ partial pressure in the gas to the $CO_2$ absorber thereby increasing the solvent loading and $CO_2$ desorbtion pressure.

A BRIEF DESCRIPTION OF THE DRAWING

DETAILED DESCRIPTION OF THE INVENTION

Figures 1, 2:
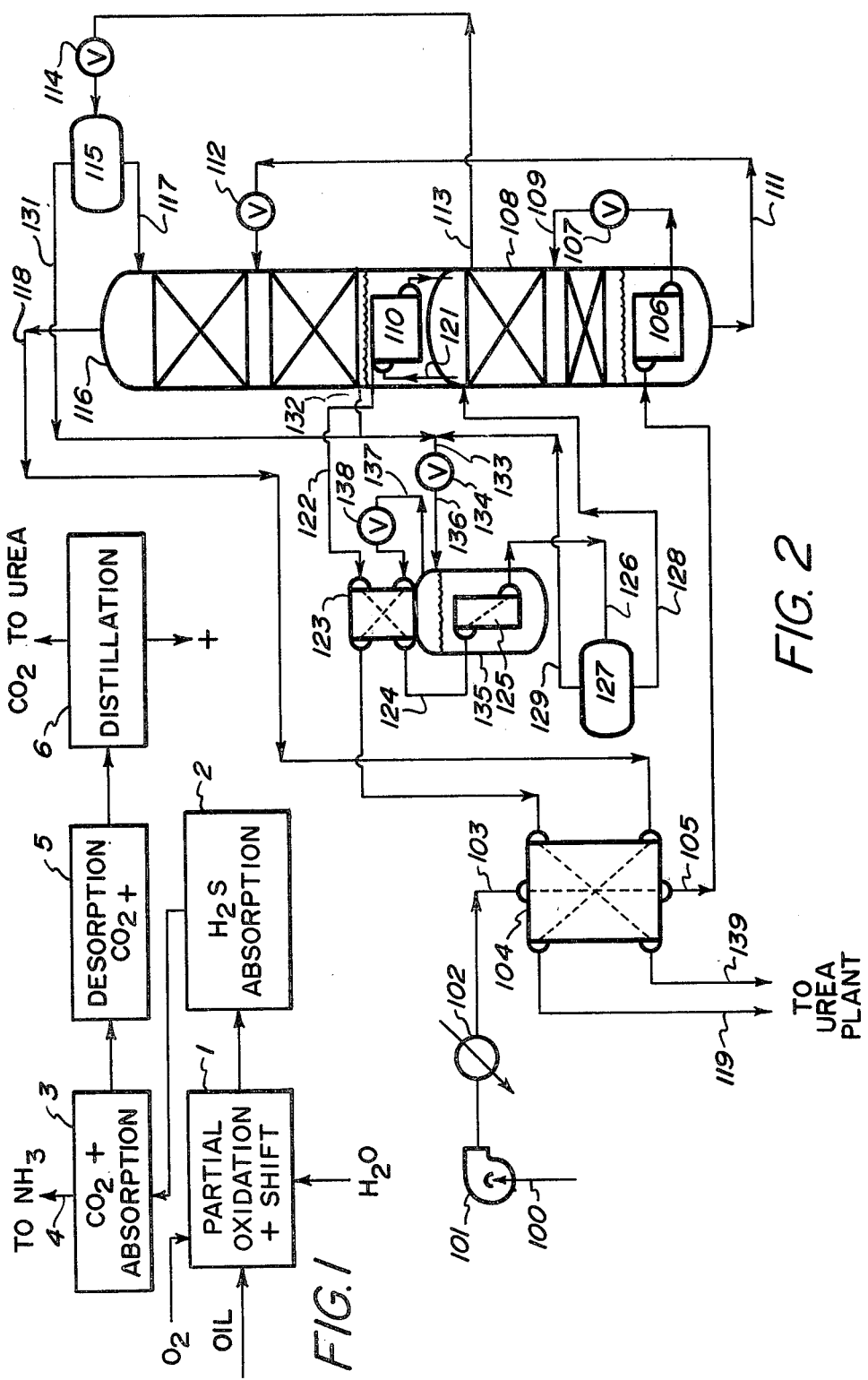
FIG. 1 is a block process flow sheet showing the recovery of a hydrogen stream suitable for ammonia synthesis and a carbon dioxide stream suitable for urea synthesis.
FIG. 2 is a process flow diagram which utilizes a dual cryogenic column for providing a carbon dioxide stream free of hydrocarbons, CO, $H_2$ and low in sulfur.

To facilitate an understanding of the invention reference is made to FIG. 1. Oil, oxygen and steam are partially oxidized to synthesis gas and the carbon monoxide is catalytically shifted to provide a raw feed gas containing (mole percent):

| | |
|---|---|
| hydrogen | 61 |
| carbon dioxide | 35 |
| carbon monoxide | 1.5 |
| methane (hydrocarbons) | 0.5 |
| hydrogen sulfide | 1 |
| carbonyl sulfide | 30 ppm |
| argon | |
| nitrogen | Balance |

The raw feed gas is recovered from partial oxidation and shift reactor 1 and passed to hydrogen sulfide absorption stage 2. In this stage the hydrogen sulfide is removed by scrubbing the raw feed gas with a physical scrubbing agent or absorbent. Numerous physical scrubbing agents can be utilized for effecting removal of the hydrogen sulfide in this step and examples of such scrubbing agents include a mixture of dialkyl $C_{1-8}$ ethers of polyalkylene glycols, e.g. polyethylene glycol utilized in the Selexol process, methanol which is used in the Rectisol process N-methyl pyrrolidone which is used in the Purisol process and many others which are conventional. Examples of Selexol scrubbing agents are noted in U.S. Pat. No. 3,362,133; 3,594,985; 3,533,732; and 3,877,893. Scrubbing in hydrogen sulfide absorption stage 2 is carried out under conventional conditions and to a degree such that the scrubbed gas leaving the hydrogen sulfide absorption stage 2 contains less than about 5 ppm hydrogen sulfide and preferably less than 1 ppm hydrogen sulfide. Of course during this hydrogen sulfide removal some of the carbonyl sulfide is removed. These conditions are controlled so that from about 30-70 percent, and preferably 40-60 percent of the initial carbonyl sulfide is removed from the feed gas in this absorption stage. This will mean that generally from about 30 to 70 percent carbonyl sulfide will remain in the gas stream leaving the hydrogen sulfide absorption stage. Substantially complete removal of carbonyl sulfide requires substantial increased solvent flow and energy consumption.

The gas leaving hydrogen sulfide absorption stage 2 is passed to a carbon dioxide absorption stage 3. Generally this absorption utilizes pure or regenerated physical scrubbing agent, the scrubbing agent being the same as that utilized for the hydrogen sulfide absorption. The carbon dioxide absorption utilizes conventional temperatures and pressures to provide a hydrogen stream which is suitable for ammonia production. The hydrogen stream is removed via line 4 from carbon dioxide absorption stage 3. The hydrogen stream removed from carbon dioxide absorption stage 3 generally contains from about 97 to 99.8 percent hydrogen with the balance consisting essentially of carbon monoxide. Less than 5, and preferably 1 ppm sulfur in the form of hydrogen sulfide and carbonyl sulfide, generally is present in this stream.

A liquid carbon dioxide laden scrubbing agent containing residual carbonyl sulfide is removed from carbon dioxide absorption stage 3. A portion of that stream is recycled to hydrogen sulfide absorption stage 2 and used as the scrubbing agent for hydrogen sulfide. The balance of the carbon dioxide laden stream is passed to desorption zone 5. Desorption is carried out in conventional manner either by a pressure reduction, inert gas stripping, or thermal regeneration or a combination of these methods. In the desorption process a gas stream comprising essentially carbon dioxide with residual amounts of methane, carbon monoxide, hydrogen as well as small proportions of carbonyl sulfide and a regenerated scrubbing agent is recovered. The regenerated physical scrubbing agent then is suited for recycle to carbon dioxide absorption zone 3.

The carbon dioxide containing gas stream from the desorber can be recovered at high pressures. When desulfurization solvent flow is reduced in the hydrogen sulfide absorption stage and part of the COS is allowed to escape to be coabsorbed with the $CO_2$ in the carbon dioxide absorption stage, the $CO_2$ coabsorbed in the desulfurization solvent is reduced in proportion to the flow. As a result, a larger fraction of the $CO_2$ is rejected to the $CO_2$ absorption/desorption steps. This increases the $CO_2$ partial pressure in the $CO_2$ absorber and results in higher solvent $CO_2$ loadings. The higher loaded solvent desorbs $CO_2$ at a higher pressure. The carbon dioxide gaseous stream from desorption zone 5 contains a small proportion of methane, carbon monoxide, and hydrogen as well as a small proportion of carbonyl sulfide and hydrogen sulfide. Generally the concentration of hydrocarbons, carbon monoxide, and hydrogen is from about 0.5 to 3 mole percent with the sulfur compounds comprising from about 0.01 to 0.0005 mole percent. Prior to utilization of the gas stream for urea synthesis, the gas stream is fractionated in distillation zone 6. There, in distillation zone 6 fractionation is carried out under pressure at cryogenic conditions whereby a carbon dioxide stream substantially free of methane, carbon monoxide, and hydrogen is recovered, the methane, carbon monoxide, and hydrogen being removed as an overhead. The carbon dioxide recovered from initial separation contains the balance of the sulfur compounds. In view of the fact the hydrocarbons, CO and $H_2$ have been removed or reduced to low levels, e.g. less than 0.01% from the carbon dioxide stream, this stream is acceptable for utilization in the urea synthesis process as the sulfur compounds are reacted and do not build up to explosive mixtures and are not deleterious for the urea synthesis. On the other hand, for preferred operation, the sulfur compounds are removed or reduced to low levels and the distillation comprises a dual distillation wherein the carbon dioxide stream is separated from the sulfur compounds and that carbon dioxide stream being utilized for urea synthesis. Alternatively, the sulfur contaminants can be separated first and then the hydrocarbons, carbon monoxide and carbon monoxide removed.

A preferred embodiment for carrying out the fractionation as set forth in distillation zone 6 is noted in FIG. 2. Referring to FIG. 2, carbon dioxide desorbed from physical absorption solvent in zone 5 is conveyed via pipe 100 to compressor 101 where it is compressed to about 15.1 bars A. After compression the gas stream then is cooled to about 10° C. in aftercooler 102. At this point the gas is dried with alumina or similar dessicant if necessary to remove water and avoid icing in subsequent processing. The cooled gas stream then is removed via pipe 103 and further cooled to about $-28°$ C. in main heat exchanger 104. The main product then is removed via pipe 105 and introduced into a double column distillation zone. Initially the cooled gas stream is introduced to reboiler 106 with the gas being partially condensed. At this point the liquid/gas mixture from reboiler 106 is removed and expanded through expansion valve 107 to a pressure of about 14 bars A. The expanded mixture then is removed via pipe 109 and introduced into the high pressure column 108.

Reflux to the high pressure column 108 is provided by reboiler/condenser 110. A liquid comprising (mole percent) $CO_2$—99.997 and $H_2S/COS$—0.003 is removed from the bottom of high pressure column 108 via pipe 111. It is expanded to 11.2 bars A through valve 112 which it leaves as a two-phase mixture at $-37°$ C. This expanded mixture then is introduced into the low pressure column 116.

A liquid fraction is withdrawn from the top portion of high pressure column 108 through pipe 113. It is expanded through valve 114, and the resulting two-phase mixture then is separated in phase separator 115. The liquid phase is removed via line 117 and charged to the low pressure column 116.

A substantially pure carbon dioxide stream (99.994 mole percent containing approximately 0.006 mole percent hydrocarbons, hydrogen and carbon monoxide with less than 1 ppm sulfur compounds is removed from low pressure column 116 via conduit 118. The refrigeration value of the carbon dioxide stream is recovered by heat exchanging against distillation feed in heat exchanger 104. Product carbon dioxide is removed via line 119. The proportion of carbon dioxide obtained via line 119 is approximately 65% of the carbon dioxide in the original feed.

Returning to the high pressure column 108 vapor through line 121 is passed through condenser/reboiler 110 to generate reflux liquid. Part of the molar flow of vapor through line 121 to condenser/reboiler 110 is withdrawn through line 122 where it is cooled against waste gas in heat exchanger 123. The cooled vapor then is removed via line 124 and further cooled against boiling waste $CO_2$ in heat exchanger 125. The vapor/liquid product then is removed via line 126 and charged to phase separator 127. A liquid component is removed from phase separator 127 through line 128 and charged to the high pressure section of the dual distillation column. The vapor from phase separator 127 is removed via line 129 where it is joined with vapor from high pressure column through line 132 and vapor through line 131 from phase separator 115. The combined vapor loads then are removed via line 133, expanded through valve 134 and then discharged to evaporator 135 via line 136. The approximate temperature of the vapor in line 136 is $-54°$ C. The vapor fraction leaves evaporator 135 through line 137 and is expanded through valve 138. The expanded gas is then rewarmed in heat exchanger 123 and then further rewarmed against feed gas in heat exchanger 104 where the resulting waste carbon dioxide is removed via line 139. That stream of carbon dioxide contains essentially all the hydrogen, CO and hydrocarbons originally present and the majority of the carbonyl sulfide and hydrogen sulfide in the feed. That stream contains approximately 35% of the original carbon dioxide in the feed. Power requirements for this process are substantially less than the prior art techniques where all of the COS was removed in the hydrogen sulfide absorption stage.

Another embodiment (not shown) is to fractionate the carbon dioxide stream and removing or reducing the sulfur compound level, e.g. COS and $H_2S$ to a low level, e.g. 5, and preferably below 1 ppm thereby leaving the hydrogen, carbon monoxide, and methane or other hydrocarbons in the carbon dioxide stream. This stream can then be further fractionated to produce a $CO_2$ stream substantially free of contaminants.

STATEMENT OF INDUSTRIAL APPLICATION

This process finds use in the treatment of industrial gas streams to remove the sulfur containing gases therein.

What is claimed is:

1. A method for producing a hydrogen stream suitable for use in ammonia synthesis and a carbon dioxide stream for use in urea synthesis from a gas feedstock containing in mole percent from 45–70% hydrogen, 25–45% carbon dioxide, 0.5–1.5% hydrogen sulfide, 0.001–0.5% carbonyl sulfide and the balance comprising carbon monoxide, argon, methane and nitrogen which comprises the steps:
    (a) physically scrubbing said gas feedstock with a carbon dioxide laden solvent in an initial scrubbing zone under conditions effective for removing substantially all of the hydrogen sulfide from said feedstock but insufficient for absorbing more than 70% of the carbonyl sulfide component thereby forming a first treated feedstock stream substantially free of hydrogen sulfide and an absorbent stream rich in hydrogen sulfide;
    (b) physically scrubbing said first treated feedstock stream substantially free of hydrogen sulfide in a second scrubbing zone under conditions effective for removing substantially all of the carbon dioxide and carbonyl sulfide therefrom thereby forming a hydrogen stream suitable for ammonia synthesis, and an absorbent stream laden with carbon dioxide and containing the major proportion of the residual carbonyl sulfide;
    (c) desorbing the absorbent stream laden with carbon dioxide under conditions for forming a gas stream of carbon dioxide, contaminated with methane, carbon monoxide, hydrogen, carbonyl sulfide and hydrogen sulfide; and
    (d) fractionating the carbon dioxide stream containing hydrogen, carbon monoxide, methane, carbonyl sulfide and residual amounts of hydrogen sulfide under conditions for removing substantially all of said residual amounts of hydrogen, carbon monoxide and methane to provide a carbon dioxide stream containing carbonyl sulfide and reduced amounts of hydrogen, carbon monoxide and methane.

2. The method of claim 1 wherein said carbon dioxide stream containing carbonyl sulfide and reduced amounts of hydrogen, carbon monoxide, and methane is further fractionated to remove said carbonyl sulfide thereby leaving a substantially pure carbon dioxide stream.

3. The process of claim 2 wherein said scrubbing in step (a) is sufficient to remove from about 40-60% of the carbonyl sulfide in said gas feedstock.

4. The process of claim 3 wherein said solvent is a mixture of alkyl ethers of a polyalkylene glycol, methanol or N-methyl pyrrolidone.

5. A method for producing a hydrogen stream suitable for use in ammonia synthesis and a carbon dioxide stream for use in urea synthesis from a gas feedstock containing in mole percent from 45-70% hydrogen, 25-45% carbon dioxide, 0.5-1.5% hydrogen sulfide, 0.001-0.5% carbonyl sulfide and the balance comprising carbon monoxide, argon, methane and nitrogen which comprises the steps:

(a) physically scrubbing said gas feedstock with a carbon dioxide laden solvent in an initial scrubbing zone under conditions effective for removing substantially all of the hydrogen sulfide from said feedstock but insufficient for absorbing more than 70% of the carbonyl sulfide component thereby forming a first treated feedstock stream substantially free of hydrogen sulfide and an absorbent stream rich in hydrogen sulfide;

(b) physically scrubbing said first treated feedstock stream substantially free of hydrogen sulfide in a second scrubbing zone under conditions effective for removing substantially all of the carbon dioxide and carbonyl sulfide therefrom thereby forming a hydrogen stream suitable for ammonia synthesis, and an absorbent stream laden with carbon dioxide and containing the major proportion of the residual carbonyl sulfide;

(c) desorbing the absorbent stream laden with carbon dioxide under conditions for forming a gas stream of carbon dioxide, contaminated with methane, carbon monoxide, hydrogen, carbonyl sulfide and hydrogen sulfide; and (d) fractionating the carbon dioxide stream containing hydrogen, carbon monoxide, methane, carbonyl sulfide and residual amounts of hydrogen sulfide under conditions for removing substantially all of the carbonyl sulfide and hydrogen sulfide to provide a carbon dioxide stream containing reduced quantities of hydrogen sulfide and carbonyl sulfide.

6. The process of claim 5 wherein said carbon dioxide stream containing trace quantities of hydrogen sulfide and carbonyl sulfide is further fractionated to remove the hydrogen, carbon monoxide and methane thereby leaving a substantially pure carbon dioxide stream.

7. The process of claim 6 wherein said scrubbing in step (a) is sufficient to remove from about 40-60% of the carbonyl sulfide in said gas feedstock.

8. The process of claim 7 wherein said solvent is a mixture of alkyl ethers of a polyalkylene glycol, methanol or N-methyl pyrrolidone.

* * * * *